United States Patent
Jiang et al.

(10) Patent No.: US 12,470,948 B2
(45) Date of Patent: Nov. 11, 2025

(54) TERMINAL INFORMATION OBTAINING METHOD, TERMINAL, AND NETWORK SIDE DEVICE

(71) Applicant: VIVO MOBILE COMMUNICATION CO., LTD., Guangdong (CN)

(72) Inventors: Dajie Jiang, Dongguan (CN); Kun Yang, Dongguan (CN); Xueming Pan, Dongguan (CN); Yanliang Sun, Dongguan (CN); Fei Qin, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 422 days.

(21) Appl. No.: 18/090,778

(22) Filed: Dec. 29, 2022

(65) Prior Publication Data

US 2023/0136962 A1    May 4, 2023

Related U.S. Application Data

(63) Continuation of application No. PCT/CN2021/106280, filed on Jul. 14, 2021.

(30) Foreign Application Priority Data

Jul. 17, 2020    (CN) .......................... 202010693760.0

(51) Int. Cl.
*H04W 16/28*    (2009.01)

(52) U.S. Cl.
CPC .................. *H04W 16/28* (2013.01)

(58) Field of Classification Search
CPC ..................................................... H04W 16/28
See application file for complete search history.

(56) References Cited

U.S. PATENT DOCUMENTS

| | | | |
|---|---|---|---|
| 8,588,817 B2 | 11/2013 | Oota | |
| 10,075,149 B2 | 9/2018 | Islam et al. | |
| 10,956,557 B2 * | 3/2021 | Plusquellic | H04L 9/0662 |
| 11,723,022 B2 * | 8/2023 | Guan | H04L 5/0094 |
| | | | 370/329 |

(Continued)

FOREIGN PATENT DOCUMENTS

| | | |
|---|---|---|
| CN | 109155659 A | 1/2019 |
| CN | 111050276 A | 4/2020 |

(Continued)

OTHER PUBLICATIONS

Wu, Qingqing, et al., "Towards Smart and Reconfigurable Environment: Intelligent Reflecting Surface Aided Wireless Network", IEEE Communications Magazine, Jan. 2020, pp. 106-112.

(Continued)

*Primary Examiner* — Fahmida S Chowdhury
(74) *Attorney, Agent, or Firm* — The Webb Law Firm

(57) ABSTRACT

The terminal information obtaining method includes: receiving a first signal sent by a terminal; and estimating first information of the terminal according to the first signal, the first information including at least one of the following: position information of the terminal, direction information of the terminal, reception beam information corresponding to the terminal, or sending beam information corresponding to the terminal.

17 Claims, 6 Drawing Sheets

(56) References Cited

U.S. PATENT DOCUMENTS

| | | | | |
|---|---|---|---|---|
| 2016/0061933 A1* | 3/2016 | Chung | ................... | G01S 5/0226 |
| | | | | 455/456.1 |
| 2019/0304238 A1* | 10/2019 | Ambauen | ........ | G06Q 20/40145 |
| 2020/0028262 A1 | 1/2020 | Fang | | |
| 2021/0136639 A1* | 5/2021 | Osawa | ................. | H04B 7/0408 |
| 2021/0382978 A1* | 12/2021 | Jeon | ........................ | G06N 20/10 |
| 2023/0107283 A1* | 4/2023 | Park | ...................... | H04W 48/08 |
| | | | | 370/329 |
| 2023/0136962 A1* | 5/2023 | Jiang | ...................... | H04B 7/063 |
| | | | | 370/329 |
| 2023/0176174 A1* | 6/2023 | Penna | ..................... | H01Q 3/46 |
| | | | | 342/451 |

FOREIGN PATENT DOCUMENTS

| | | | | | |
|---|---|---|---|---|---|
| CN | 111093267 | A | | 5/2020 | |
| CN | 111245492 | A | | 6/2020 | |
| CN | 111245493 | A | | 6/2020 | |
| CN | 111245494 | A | | 6/2020 | |
| CN | 111416646 | A | | 7/2020 | |
| CN | 111093267 | B | * | 3/2021 | .......... H04W 64/006 |
| JP | H08274700 | A | | 10/1996 | |
| JP | 2012009968 | A | | 1/2012 | |
| JP | 2019536328 | A | | 12/2019 | |
| WO | 2018167935 | A | | 9/2018 | |
| WO | 2020042081 | A1 | | 3/2020 | |

OTHER PUBLICATIONS

Guo, Yajing et al., "Beam Tracking and Coverage Enhancement Algorithm for Mobile Users with Intelligent Reflecting Surface", ZTE Technology Journal, Apr. 2021, pp. 54-59, vol. 27, No. 2 with abstract.

Yang, Kun et al., "Overview of the Intelligent Surface for 6G Communications", Mobile Communications, Jun. 30, 2020, pp. 70-81, No. 6 with abstract.

* cited by examiner

TERMINAL INFORMATION OBTAINING METHOD, TERMINAL, AND NETWORK SIDE DEVICE

CROSS-REFERENCE TO RELATED APPLICATIONS

This application is a Bypass Continuation Application of PCT/CN2021/106280 filed Jul. 14, 2021, which claims priority to Chinese Patent Application No. 202010693760.0 filed Jul. 17, 2020, the disclosures of which are hereby incorporated by reference in their entirety.

BACKGROUND OF THE INVENTION

Field of the Invention

This disclosure relates to the field of wireless communications technologies, and in particular, to a terminal information obtaining method, a terminal, and a network side device.

Description of Related Art

The intelligent surface is an emerging technology, and the intelligent surface device may also be referred to as a large intelligent surface (LIS), a smart reflect array (SRA), a reconfigurable reflect array (RRA), or an intelligent reflecting surface (IRS).

The intelligent reflecting surface IRS is made of a plurality of low-cost passive reflection elements, and the IRS is an electromagnetic metamaterial or a metasurface. Each reflection element can independently induce changes in an amplitude and/or phase and/or polarization manner of an incident signal, that is, reconfigure a wireless propagation environment by controlling reflection.

Compared with the existing active relay communication, the IRS does not use an active transmitting module, but only reflects the received signal. The active relay communication generally operates in a half-duplex mode, which is less spectrally efficient than the IRS operating in a full-duplex mode. Compared with the existing backscatter communication (such as radio frequency identification (RFID)), an IRS is used as a passive reflective device and does not send information thereof, which is only used to facilitate an existing communication link. The IRS is a passive array and is generally used as a reflect array. Compared with the large-scale multiple input multiple output (MIMO) technology, the IRS has low hardware cost, low transmission loss, and is more suitable for millimeter-level frequency bands (mmWave).

In some cases, the terminal (UE) is within a coverage range of the intelligent surface device or relay-type device (repeater), but is beyond a coverage range of a base station associated with the intelligent surface device or the repeater. However, since the intelligent surface device or the relay-type device generally only performs forwarding, but does not acquire information, and consequently, related information of the terminal cannot be acquired.

SUMMARY OF THE INVENTION

According to a first aspect, a terminal information obtaining method is provided, applied to a first network node, where the first network node is an intelligent-surface-type device or a relay-type device and the method includes: receiving a first signal sent by a terminal; and estimating first information of the terminal according to the first signal, where the first information including at least one of the following: position information of the terminal, direction information of the terminal, reception beam information corresponding to the terminal, or sending beam information corresponding to the terminal.

According to a second aspect, a signal receiving method is provided, applied to a terminal and the method includes: receiving a fourth signal sent by a first network node, where the first network node is an intelligent-surface-type device or a relay-type device; and sending a fifth signal to the first network node or a second network node, where the fifth signal carries some or all of information related to the fourth signal, and the second network node is a base-station-type device associated with the first network node.

According to a third aspect, a terminal information obtaining apparatus is provided, applied to a first network node, where the first network node is an intelligent-surface-type device or a relay-type device and the apparatus includes: a first receiving module, configured to receive a first signal sent by a terminal; and an estimation module, configured to estimate first information of the terminal according to the first signal, where the first information including at least one of the following: position information of the terminal, direction information of the terminal, reception beam information corresponding to the terminal, or sending beam information corresponding to the terminal.

Optionally, the receiving, by the first receiving module, the first signal sent by the terminal includes: receiving the first signal sent by the terminal in a time domain repetition manner.

Optionally, beams used for the first signal sent in the time domain repetition manner are different.

Optionally, the receiving, by the first receiving module, the first signal sent by the terminal includes: receiving the first signal sent by the terminal in a manner of polling reception beams of the first network node.

Optionally, beams used for the first signal sent in the time domain repetition manner are the same.

Optionally, the first signal is carried by one of the following sequences:
SRS;
DMRS;
a RACH sequence; or
a dedicated sequence of the first signal.

Optionally, a format of the first signal is configured by a network side or preset.

Optionally, the receiving the first signal sent by the first receiving module includes:
obtaining the first signal through sequence detection; and/or
obtaining the first signal through energy detection;

Optionally, the apparatus may further include: a first sending module, configured to send a second signal to a second network node after the first information of the terminal is estimated according to the first signal, where the second signal carries all or some of content of the first information, and the second network node is a base-station-type node associated with the first network node.

Optionally, information carried by the second signal further includes at least one of the following:
information related to an identifier of the terminal;
indexes of the received first signal; or
intensity-related of the first signal corresponding to each of the indexes.

Optionally, the first receiving module is further configured to: receive, after the second signal is sent to a second network node, a third signal sent by the second network node; and the estimation module is further configured to adjust a transmission mode of the first network node according to the third signal.

Optionally, the adjusting, by an estimation module, a transmission mode of the first network node according to the third signal includes: adjusting states of a reflection unit and/or a refraction unit in the first network node according to the third signal.

Optionally, the transmission mode includes at least one of the following:
a beam;
TCI information; or
QCL information.

Optionally, the estimation module is further configured to adjust, according to the first information, a sending beam and/or a reception beam associated with the terminal after estimating the first information of the terminal according to the first signal.

According to a fourth aspect, a signal receiving apparatus is provided, applied to a terminal and the apparatus includes: a second receiving module, configured to receive a fourth signal sent by a first network node, where the first network node is an intelligent-surface-type device or a relay-type device; and a second sending module, configured to send a fifth signal to the first network node or a second network node, where the fifth signal carries some or all of information related to the fourth signal, and the second network node is a base-station-type device associated with the first network node.

Optionally, the fourth signal carries second information, the second information including at least one of the following:
synchronization information;
identification information of the first network node;
beam information of the first network node;
a time window during which the first network node performs forwarding; or
the beam information of the first network node and time information associated with the beam information of the first network node.

Optionally, the receiving, by the second receiving module, the fourth signal sent by the first network node includes at least one of the following:
receiving the fourth signal in a manner of polling reception beams;
obtaining the fourth signal through sequence detection; or
obtaining the fourth signal through energy detection.

Optionally, the some or all of information related to the fourth signal includes at least one of the following:
at least one piece of target reception beam information, where the at least one piece of target reception beam information is related information of a reception beam with a strongest signal intensity that is estimated according to the fourth signal;
at least one piece of target sending beam information, where the at least one piece of target sending beam information is related information of a sending beam corresponding to the reception beam with the strongest signal intensity; or
information related to an identifier of the terminal.

Optionally, the sending the fifth signal by the second sending module includes: sending the fifth signal in a target slot.

Optionally, the target slot is a slot in a forwarding time window of the first network node.

Optionally, the sending a fifth signal by a second sending module includes: sending the fifth signal to the first network node, so that the fifth signal is forwarded to the second network node by the first network node.

Optionally, the target slot is a slot outside a forwarding time window of the first network node.

Optionally, the sending the fifth signal by the second sending module includes: sending the fifth signal by using a target sending beam, where the target sending beam corresponds to a target reception beam, and the target reception beam is a beam used for receiving the fourth signal with a strongest signal intensity.

According to a fifth aspect, a network side device is provided, including a processor, a memory, and a program or instructions stored in the memory and executable on the processor, the program or instructions, when executed by the processor, implementing the steps of the method according to the first aspect.

According to a sixth aspect, a terminal is provided, including a processor, a memory, and a program or instructions stored in the memory and executable on the processor, the program or instructions, when executed by the processor, implementing the steps of the method according to the second aspect.

According to a seventh aspect, a non-transitory readable storage medium is provided, the non-transitory readable storage medium storing a program or instructions, the program or instructions, when executed by the processor, implementing the step of the method according to the first aspect, or the step of the method according to the second aspect.

According to an eighth aspect, a chip is provided, including a processor and a communication interface, the communication interface being coupled to the processor, and the processor being configured to run a program or instructions of a network side device to implement the method according to the first aspect, or the method according to the second aspect.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. All other embodiments obtained by a person skilled in the art based on the embodiments of this application shall fall within the protection scope of this application.

In the specification and the claims of this application, the terms "first", "second", and so on are intended to distinguish similar objects but do not necessarily indicate a specific order or sequence. It is to be understood that the data termed in such a way is interchangeable in proper circumstances, so that the embodiments of this application can be implemented in other sequences than the sequence illustrated or described herein. In addition, the objects distinguished by "first", "second", and the like are usually of one type, and a quantity of objects is not limited, for example, there may be one or more first objects. In addition, "and/or" used in the specification and the claims represents at least one of the connected objects, and a character "/" in this specification generally indicates an "or" relationship between the associated objects.

It is to be noted that, the technologies described in the embodiments of this application are not limited to a long term evolution (LTE)/LTE-Advanced (LTE-A) system, or may be applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and another system. In the embodiments of this application, the terms "system" and "network" are usually interchangeably used, and the technology described herein can be applied to the systems and radio technologies mentioned above, and can also be applied to other systems and radio technologies. However, although the technologies are also applicable to applications other than NR system applications, for example, a $6^{th}$ generation (6G) communication system, a new radio (NR) system is exemplarily described in the following descriptions, and the term "NR" is used in most of the following descriptions.

Figure 1:
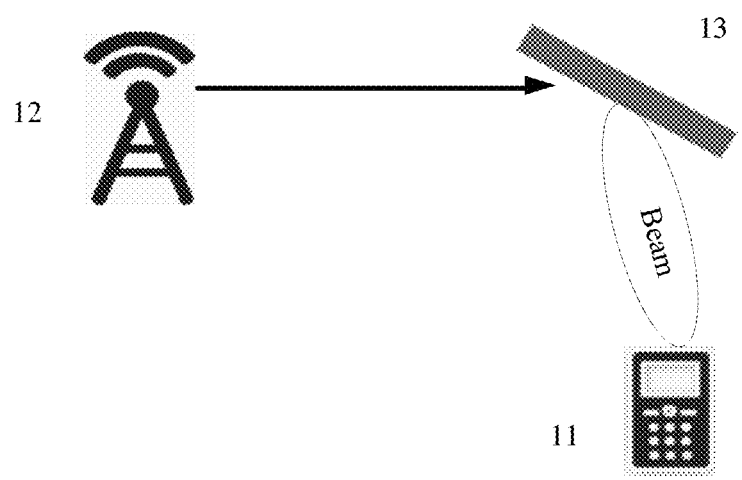
FIG. 1 is a block diagram of a wireless communication system to which an embodiment of this application is applicable.

FIG. 1 shows a block diagram of a wireless communication system to which an embodiment of this application is applicable. The communication system includes a terminal 11, a network side device 12, and a first network node 13. However, the terminal 11 may also be referred to as a terminal device or a user equipment (UE). The terminal 11 may be a terminal side device such as a mobile phone, a tablet personal computer, a laptop computer or notebook computer, a Personal Digital Assistant (PDA), a palmtop computer, a notebook, an ultra-mobile personal computer (UMPC), a Mobile Internet Device (MID), a wearable device, a vehicle user equipment (VUE), a pedestrian user equipment (PUE), or the like. The wearable device includes a bracelet, a headset, glasses, and the like. It is to be noted that, the type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set BSS), an extended service set (ESS), a B node, an evolved B node (eNB), a home B node, a home evolved B node, a WLAN access point, a Wi-Fi node, a transmitting receiving point (TRP), or another suitable term in the field. The base station is not limited to a technical term as long as the same technical effect is achieved. It is to be noted that, in the embodiments of this application, a base station in the NR system is only used as an example, but the type of the base station is not limited.

The first network node 13 may be an intelligent-surface-type device or a relay-type device (repeater). The intelligent-surface-type device includes but is not limited to: an intelligent reflecting surface (IRS) device, a large intelligent surface (LIS), a smart reflect array (SRA), or a reconfigurable reflect array (RRA). Each reflection element of the intelligent-surface-type device can independently induce changes in an amplitude and/or phase and/or polarization manner of an incident signal, that is, reconfigure a wireless propagation environment by controlling reflection. In addition, the intelligent-surface-type devices do not use RF chains and only operate in a short distance, and therefore may be densely deployed. Compared with existing backscatter communication (such as RFID), an IRS is used as a passive reflective device and does not send information thereof, which is only used to facilitate an existing communication link. Compared with an existing large-scale MIMO technology, the IRS is a passive array, while large-scale MIMO is an active array. The IRS is generally used as a reflect array, while the large-scale MIMO is generally used as a transmission array.

IRS reflection units are mainly of the following types: A. Tunable resonator: A variable capacitor is integrated into the resonator to generate a phase shift by changing the frequency of a frequency-agile patch resonator. B. Guided wave control method: In this case, an arrived space wave is coupled to a guided wave by an antenna, and then is re-emitted as the guided wave is phase-shifted, to form an antenna phase shifter. C. Rotation technology of circularly polarized waves: Design using a reflection rule of electromagnetic waves.

From the perspective of whether it can be dynamically controlled, reflect arrays/intelligent surfaces are divided into two types:

1) Static reflect array/intelligent surface: The structure and function of the reflect array may be fixed. For an incident wave at an angle, the metasurface unit leads to a fixed change in the amplitude, phase, polarization, and other characteristics of the incident wave, and a corresponding reflected wave is obtained.

2) Dynamic reflect array/intelligent surface: The structure and function of the reflect array is controllable. For an incident wave at an angle, the amplitude, phase, polarization, and other characteristics of the incident wave may be changed differently through programmable control, and a corresponding reflected wave is obtained. To achieve programmable control of reflective metasurfaces, switch elements (such as diodes, RF-MEMS switches, and the like) need to be configured in the reflection unit.

PIN diodes are a common choice for controlling reconfigurable metasurfaces. PIN diodes have a wide range of RF impedance and low distortion, and are widely used in the microwave RF field. The switch element in the reflection unit has a plurality of different states, and different states can be switched by controlling on or off of the switch element. The structure and performance of the corresponding reflection unit greatly change in a case that the switch element is on or off. That is, the reflection units in different states have different control modes for the amplitude, phase, polarization, and other characteristics of the incident wave.

The technical solutions provided in the embodiments of this application are described in detail below with reference to the accompanying drawings by using some embodiments and application scenarios thereof.

Figure 2:
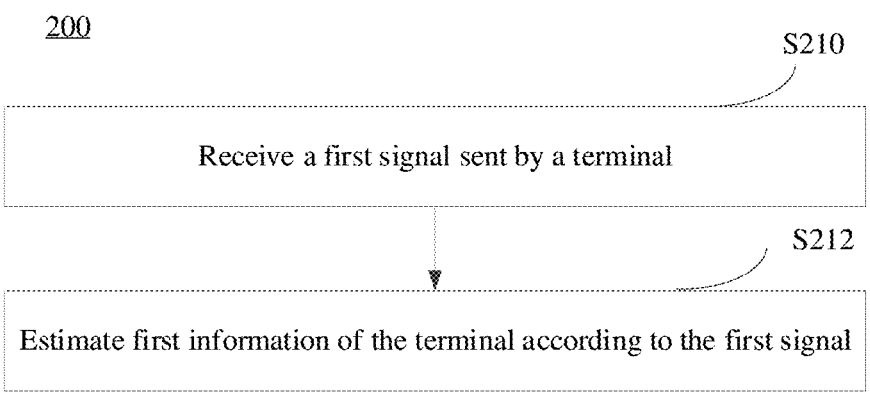
FIG. 2 is a schematic flowchart of a terminal information obtaining method according to an embodiment of this application.

FIG. 2 is a schematic flowchart of a terminal information obtaining method according to an embodiment of this application. The method 200 may be performed by a first network node. In other words, the method may be performed by software or hardware installed on the first network node, where the first network node may be an intelligent-surface-type device or a relay-type device. As shown in FIG. 2, the method may include the following steps.

S210: Receive a first signal sent by a terminal.

In this embodiment of this application, the terminal may send the first signal by using a beam. In a possible implementation, the terminal may send the first signal in a time domain repetition manner, that is, repeatedly send the first signal in a time domain. Therefore, in such a possible implementation, S210 may include: receiving the first signal sent by the terminal in a time domain repetition manner. In such a possible implementation, the terminal may increase a success rate of receiving the first signal by the first network node by repeatedly sending the first signal in the time domain.

In the foregoing possible implementation, to ensure the success rate of receiving the first signal by the first network node, in a possible implementation, beams used for the first signal sent in the time domain repetition manner are different, that is, beams used for sending the first signal by the terminal at different moments are different, thereby avoiding a problem that the first network node fails to receive the first signal due to a blocked beam, and the like. In addition, the terminal sends the first signal by using different beams at different moments, which may also help the first network node acquire more beam information of the terminal. Certainly, this application is not limited thereto. The beams used for the first signal sent in the time domain repetition manner are the same, that is, the beams used for sending the first signal by the terminal at different moments may also be the same.

In a possible implementation, since the first network node does not learn the beams used for sending the first signal by the terminal, in S210, the first network node may receive the first signal sent by the terminal in a manner of polling reception beams. For example, assuming that the first network node has 4 reception beams, the first network node may first perform receiving by using the first reception beam, then perform receiving by using the second reception beam, then perform receiving by using the third reception beam, then perform receiving by using the fourth reception beam, and then perform receiving by using the first reception beam, to perform receiving in a polling manner.

In a possible implementation, the first signal may be carried by a predetermined signal. For example, the first signal is carried by one of the following signals: a sounding reference signal (SRS); a demodulation reference signal (DMRS); a random access channel (RACH) sequence, for example, a random access preamble; or a dedicated sequence of the first signal. In such a possible implementation, the first network node may receive the first signal in a manner of polling reception beams according to a chronological order.

In a possible implementation, a format of the first signal may be configured by a network side or preset, for example, specified in a protocol. For example, the network side may pre-configure the first signal to be carried by one signal mentioned above, that is, sequence-related information of the first signal. For example, the network side may pre-configure or the protocol may pre-specify an association manner between a sequence format of the first signal and a terminal identifier, and the like. Certainly, this application is not limited thereto. For example, the network side may pre-configure or the protocol may pre-specify a time frequency resource sent by the first signal without limiting a format of the first signal.

In a possible implementation, in S210, in a case that receiving the first signal, the first network node may obtain the first signal through sequence detection. For example, in a case that the network side configures association manner between the sequence format of the first signal and the terminal identifier, the first network node may determine, through sequence detection, a terminal that sends the first signal; and/or the first network node may further obtain the first signal through energy detection. For example, the terminal may detect whether energy of a reception beam reaches or exceeds a preset threshold, to obtain a fourth signal.

In a possible implementation, the first network node may receive the first signal through a first module thereof (that is, a module having a receiving function).

S212: Estimate first information of the terminal according to the first signal, where the first information includes at least one of the following: position information of the terminal, direction information of the terminal, reception beam information corresponding to the terminal, or sending beam information corresponding to the terminal.

For example, in a case that the network side configures association manner between the sequence format of the first signal and the terminal identifier, the first network node may determine, through sequence detection, a terminal that sends the first signal. A reception beam signal corresponding to the terminal and a sending beam signal corresponding to the terminal are determined according to reception beams used for receiving the first signal. Information such as direction information of the terminal relative to the network side device is estimated by receiving information such as intensity of the first signal.

The terminal is within a coverage range of the intelligent-surface-type device or the repeater, but is beyond a coverage range of a base station associated with the intelligent-surface-type device or the repeater. To enable the base station to find and provide services for the terminals, in a possible implementation, after S212, the method may further include: sending a second signal to a second network node, where the second signal carries all or some of content of the first information, and the second network node is a base-station-type node associated with the first network node. For example, the second network node may be the network side device 12 in FIG. 1.

In a possible implementation, the second signal further includes at least one of the following (1) to (3):

(1) Information related to an identifier of the terminal. For example, the information may be sequence-related information of an SRS, a DMRS, a RACH, or another signal, such as a scrambling code sequence index, to help the base station identify the terminal. For example, the information may further be sequence information received on different reception beams.

(2) Indexes of the received first signal.

(3) Intensity-related information of the first signal corresponding to each of the indexes.

The index is used for identifying the received first signal, while the intensity-related information is used for indicating intensity information of the first signal corresponding to the index, for example, energy and/or power information received on different reception beams (corresponding to different indexes).

In a possible implementation, the first network node may report the second signal through a third module thereof (that is, a module having a sending function).

In a possible implementation, the reporting the second signal by the first network node may further include: transmitting, by the first network node, third information to the second network node (such as a gNB) through control information. The third information may indicate resource information required by the UE for beam management, where resources used for beam management include at least a CSI-RS resource and/or an SRS resource. The resource information may include at least a quantity of single-port CSI-RS/SRS resources or a total quantity of required ports.

The third information may be determined based on quality of the first signal that is sent by the UE and received by the first network node.

In a possible implementation, after the sending the second signal to the second network node, the method may further include: receiving a third signal sent by the second network node; and adjusting a transmission mode of the first network node according to the third signal. In such a possible implementation, the second network node may determine, according to the received second signal, whether to adjust the transmission mode of the first network node and how to adjust the transmission mode of the first network node, and send the corresponding third signal to the first network node, to adjust the transmission mode of the first network node, thereby improving quality of sending or receiving a signal by the first network node.

In a possible implementation, the adjusting the transmission mode may include: adjusting at least one of the following: a beam; transmission configuration index (TCI) information; or quasi-colocation (QCL) information. In such a possible implementation, the quality of sending a signal and/or receiving a signal by the first network node may be improved.

The first network node may be a non-base-station device such as an intelligent-surface-type device or a repeater. In a case that the first network node is an intelligent-surface-type device, the intelligent-surface-type device may optionally include a first module having a function of receiving a signal and a second module having a function of adjusting a phase, an amplitude, or a polarization manner of an external signal. For example, the first module may only support an energy detection function or a sequence receiving function, but does not support a complex function such as channel decoding. Optionally, the intelligent-surface-type device may further include a third module that supports sending of information of the third module to the terminal or the base station.

Therefore, in the possible implementation, the adjusting the transmission mode of the first network node according to the third signal may include: adjusting states of a reflection unit and/or a refraction unit in the first network node according to the third signal.

In other words, the transmission mode of the first network node may be implemented by adjusting a switch pattern of a switch element of a reflection or refraction unit in the first network node device. The transmission mode is related to a beam direction, the switch element enables the reflection unit or refraction unit to have a plurality of different states, and different states are switched by control on or off of the switch element, where directions, phases, amplitude and/or polarization manners of reflection waves or refraction waves corresponding to different states are different. For example, 1 indicates on of the switch element, and 0 indicates off of the switch element. A pattern of a switch element of a 100*100 emission unit is a 100*100 dimensional 01-bit matrix.

In a case that the first network node is a repeater, the repeater may be any one of repeaters that performs direct forwarding, transparent forwarding, amplification forwarding, or performs demodulation and sending a signal. This is not limited in this embodiment of this application.

Optionally, the repeater includes a first module that receives a signal and a second module that forwards a signal. Optionally, the repeater further includes a third module that supports sending of information of the third module to the terminal or the base station.

The base station associated with the first network node may have the following features: The base station controls the transmission mode (for example, a beam/TCI/QCL) of the first network node by sending signaling to the first network node, or a sending signal and a reception signal of the base station are forwarded by the first network node.

In a possible implementation, the first network node may further directly adjust a sending beam and/or a reception beam associated with the terminal according to estimated first information of the terminal. Therefore, in such a possible implementation, after S212, the method may further include: adjusting, according to the first information, a sending beam and/or a reception beam associated with the terminal. For example, the first network node may adjust the sending beam and/or the reception beam thereof according to estimated direction information of the terminal, to improve quality of signal transmission between the first network node and the terminal. For example, the first network node is implemented by adjusting the second module thereof.

In the technical solutions provided in the embodiments of this application, after receiving a first signal sent by a terminal, a first network node (including an intelligent-surface-type device or a relay-type device) estimates first information of the terminal according to the first signal, to acquire position information, direction information, and reception beam information or sending beam information of the terminal, and further acquire related information of the terminal according to the first information, thereby resolving the problem that the intelligent surface device or the relay-type device cannot acquire the related information of the terminal.

In addition, in this embodiment of this application, the first network node may further forward the acquired first information to the base station associated with the first network node, and the base station may acquire the terminal and communicate with the terminal based on report of the first network node. In addition, the base station may further send the third signal to the first network node based on the acquired information, to adjust the transmission mode of the first network node, thereby improving communication quality. Alternatively, the first network node may adjust the sending beam and/or the reception beam associated with the terminal according to the estimated first information, to improve the quality of signal transmission between the first network node and the terminal.

Figure 3:
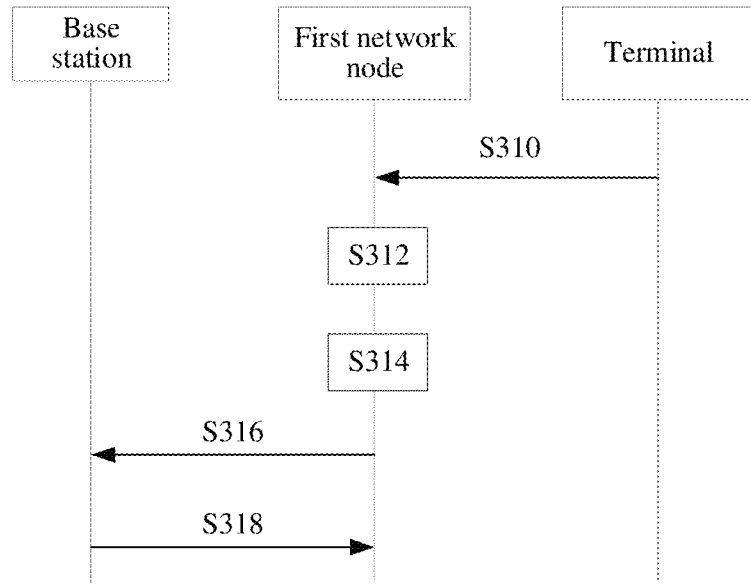
FIG. 3 is another schematic flowchart of a terminal information obtaining method according to an embodiment of this application.

FIG. 3 is another schematic flowchart of a terminal information obtaining method according to an embodiment of this application. The method 300 may be performed by a terminal, a first network node, and a base station, where the base station is the second network node in the foregoing method 200. In other words, the method may be performed by software or hardware installed on the terminal, the first network node, and the base station. As shown in FIG. 3, the method may include the following steps.

S310: A terminal (UE) sends a first signal to a first network node.

Optionally, the UE may send the first signal in a time domain repetition manner, for example, the first signal is sent by using the same or different beams at different moments.

S312: The first network node receives the first signal sent by the UE.

The first signal may be carried by an SRS, DMRS, RACH sequence or another sequence (for example, a dedicated sequence, and the like).

The first network node may receive the first signal in a manner of polling reception beams according to a chronological order, where a format such as the sequence-related information of the first signal may be configured by a network side or specified in a protocol. For example, the protocol specifies an association manner between a sequence format and a UE ID. Alternatively, only a time frequency resource sent by the first signal may also be specified, and a format of the signal is not limited.

Optionally, the first network node may perform receiving through the first module (which is a module having a function of receiving a signal).

Optionally, the first network node may receive the first signal in a manner of polling reception beams.

S312 is similar to S210 in the method 200. For details, reference may be made to the description of S210 in the method 200.

S314: The first network node estimates first information of the UE according to the received first signal sent by the UE, where the first information includes, but is not limited to one or more of position information of the UE, direction information of the UE, a reception beam and/or sending beam of the corresponding first network node.

Optionally, the first network node may obtain, through sequence detection, the first signal sent by the UE.

Optionally, the first network node may also obtain, through energy detection, the first signal sent by the UE.

S314 is similar to S212 in the method 200. For other details that are not described, reference may be made to the description of S212 in the method 200.

After determining the first signal sent by the UE, the first network node may adjust the sending beam and/or the reception beam associated with the UE, to improve the quality of signal transmission between the first network node and the UE.

Optionally, the first network node may also report the second signal to the base station, to help the terminal complete sending and receiving for the base station associated with the first network node. Therefore, after S314, the method may further include S316 and S318.

S316: The first network node reports the second signal to the base station associated with the first network node through the third module (which is a module having a function of sending a signal).

The second signal may include reception/sending beam information or position information or direction information of the first network node corresponding to the UE that is estimated by the first network node.

Optionally, the second signal may further include UE ID-related information, sequence-related information of an SRS, a DMRS, a RACH, or another signal, such as a scrambling code sequence index, to help the base station identify the UE. For example, the information may further include sequence information received on different reception beams.

Optionally, the second signal may further include energy information/power information of the first signal that is received by the first network node, for example, energy information/power information received on different reception beams.

S318: The base station sends signaling (that is, a third signal) to the first network node to adjust the transmission mode of the first network node, to adjust a sending behavior and/or a receiving behavior of the first network node.

For a adjustment manner, reference may be made to the related description in the method 200. Details are not described herein again.

In the method provided in the embodiments of this application, the first network node receives the signal sent by the UE, determines the position information, direction information, reception beam information or sending beam information, and the like of the UE, and reports the information to the base station, so that the base station can determine a beam direction between the first network node and the UE based on this, thereby facilitating the base station in finding the UE and providing services for the UE, and resolving a communication problem between the UE and the base station corresponding to the first network node.

Figure 4:
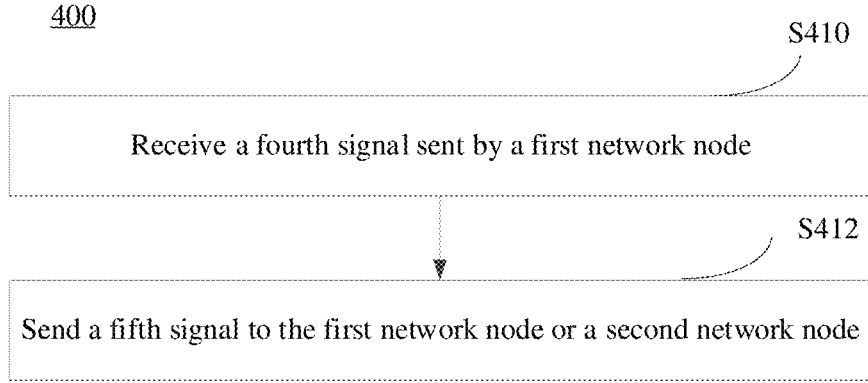
FIG. 4 is a schematic flowchart of a signal receiving method according to an embodiment of this application.

FIG. 4 is a schematic flowchart of a signal receiving method according to an embodiment of this application. The method 400 may be performed by a terminal. In other words, the method may be performed by software or hardware installed on the terminal. As shown in FIG. 4, the method may include the following steps.

S410: Receive a fourth signal sent by a first network node, where the first network node is an intelligent-surface-type device or a relay-type device.

In a possible implementation, the fourth signal carries second information, where the second information may include at least one of the following (1) to (5):

(1) Synchronization information.

Synchronization between the terminal and the first network node may be achieved through the information.

(2) Identification information of the first network node.

The terminal may learn, through the information, the first network node that sends the fourth signal.

(3) Beam information of the first network node.

The terminal may acquire, through the information, beam information that can be used by the first network node, thereby determining beam information that can be used when a signal is sent to the first network node.

(4) A time window during which the first network node performs forwarding.

The terminal may acquire, through the information, a time window during which the first network node performs forwarding, that is, the first network node forwards a signal in the time window, the terminal may send, in the time window, a signal that is transmitted to the base station and is not necessarily processed by the first network node, and the first network node transparently transmits the signal received in the time window to the base station.

(5) Time information associated with the beam information of the first network node.

The terminal may acquire, through the information, the beam information that can be used by the first network node and time information corresponding to different beams. For example, a time corresponding to a beam 1 is the first downlink slot and the second uplink slot in a TDD cycle (assuming that the cycle is composed of 2 downlink slots and 2 uplink slots), and a time corresponding to a beam 2 is the second downlink slot and the first uplink slot in a TDD cycle. In this way, the terminal determines beam information and slots that can be used when a signal is sent to the first network node, and determines beam information and slots that can be used when the signal is received from the first network node.

For example, the first network node may send the fourth signal to the UE in a beam scanning form or in a broadcast form.

Optionally, the first network node sends the fourth signal through the third module (which is a module having a function of transmitting a signal).

In a possible implementation, S410 may include at least one of the following (1) to (3):

(1) Receive the fourth signal in a manner of polling reception beams.

In other words, the terminal detects whether the fourth signal is transmitted in the manner of polling reception beams according to a chronological order, and receives the transmitted fourth signal.

(2) Obtain the fourth signal through sequence detection.

Similar to the method 200, the UE may obtain the fourth signal through sequence detection. For example, the terminal may detect a sequence sent by the first network node, and obtains the fourth signal in a case that the sequence format matches a predetermined sequence format.

(3) Obtain the fourth signal through energy detection.

For example, the terminal may detect that energy of a reception beam reaches or exceeds a preset threshold, to obtain the fourth signal.

S412: Send a fifth signal to the first network node or a second network node, where the fifth signal carries some or all of information related to the fourth signal, and the second network node is a base-station-type device associated with the first network node.

In a possible implementation, some or all of information related to the fourth signal carried in the fifth signal includes, but is not limited to at least one of (1) to (3):

(1) At least one piece of target reception beam information. The at least one piece of target reception beam information is related information of a reception beam with a strongest signal intensity that is estimated according to the fourth signal.

(2) At least one piece of target sending beam information. The at least one piece of target sending beam information is related information of a sending beam corresponding to the reception beam with the strongest signal intensity.

For example, the terminal receives the fourth signal by using a reception beam 1 and a reception beam 2. A signal intensity of the fourth signal that is received by using the reception beam 1 is stronger than that of the fourth signal that is received by using the reception beam 2. Therefore, the target reception beam information is related information of the reception beam 1, and the target sending beam information is related information of a sending beam (for example, a sending beam 1) corresponding to the reception beam 1.

The related information of the reception beam may be a synchronization signal block (SSB) index, or a strongest receiving intensity of an SSB.

(3) Information related to an identifier of the terminal. For example, in a case that a network side configures an association relationship between the sequence format and the terminal identifier, the information related to the identifier of the terminal may be an identifier (for example, an index) of the sequence format corresponding to the terminal identifier.

In a possible implementation, the sending the fifth signal in S412 may include: sending the fifth signal in a target slot.

In a possible implementation, the target slot may be a slot in a forwarding time window of the first network node. In such a possible implementation, the fifth signal is a signal sent to the base station, where the signal only needs to be forwarded through the first network node and is not necessarily processed by the first network node.

Alternatively, in another possible implementation, the target slot may also be a slot outside a forwarding time window of the first network node. In such a possible implementation, the fifth signal is a signal (for example, the first signal in the method 200 and the method 300) sent to the first network node, and the terminal may send the fifth signal in the sending manner of the first signal described in the method 200 and the method 300. After receiving the fifth signal, the first network node may correspondingly perform processing according to the description of the method 200 and the method 300, and for details, reference may be made to the description of the method 200 and the method 300. Details are not described herein again.

In a possible implementation, to ensure quality of receiving the fifth signal by the first network node, the sending a fifth signal in S412 may include: sending the fifth signal by using a target sending beam, where the target sending beam corresponds to a target reception beam, and the target reception beam is a beam used for receiving the fourth signal with a strongest signal intensity. For example, when the terminal receives the fourth signal, a signal intensity of the fourth signal received by using the reception beam 2 is strongest. In S412, the terminal may send the fifth signal by using a sending beam corresponding to the reception beam 2. In this way, the signal intensity of the fifth signal received by the first network node may be ensured.

In the technical solutions provided in the embodiments of this application, the first network node sends the fourth signal to the terminal, the terminal receives the signal and determines related information of the fourth signal, and sends some or all of information of the fourth signal to the second network node associated with the first network node, so that the second network node (that is, the base station) may find the terminal and provide services for the terminal.

Figure 5:
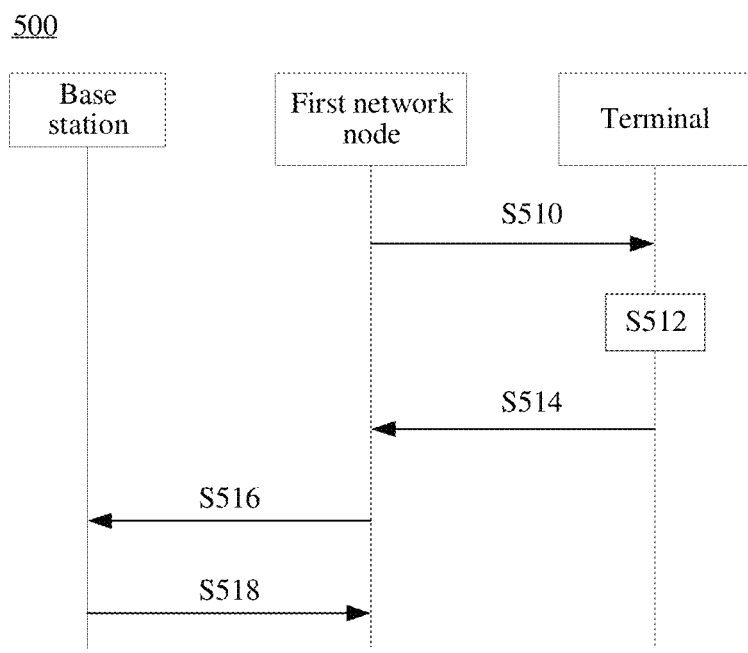
FIG. 5 is another schematic flowchart of a signal receiving method according to an embodiment of this application.

FIG. 5 is another schematic flowchart of a signal receiving method according to an embodiment of this application. As shown in FIG. 5, the method 500 may be performed by a terminal (UE), a first network node, and a base station, where the base station is the second network node in the foregoing method 400. In other words, the method may be performed by software or hardware installed on the terminal, the first network node, and the base station. As shown in FIG. 5, the method may include the following steps.

S510: The first network node sends the fourth signal to the terminal in a beam scanning form or in a broadcast form.

Information carried by the fourth signal includes at least one of synchronization information, id information of the first network node, beam information, a time window during which the first network node performs forwarding, or the like.

Optionally, the first network node may send the fourth signal through the third module of the first network node.

Optionally, the information carried by the fourth signal includes time information and beam information associated with the time information.

S512: The UE receives the fourth signal.

Optionally, the UE receives the fourth signal in a manner of polling reception beams.

Optionally, the UE may obtain the fourth signal through sequence detection.

Optionally, the UE may acquire the fourth signal through energy detection.

S514: The UE sends the fifth signal according to a protocol definition rule after acquiring the information carried by the fourth signal.

The fifth signal may carry at least one of the following: one or more pieces of strongest reception beam information/sending beam information (for example, a strongest SSB index and/or SSB receiving intensity, and the like) estimated according to the fourth signal by the UE, related information of an idiom UE ID, or the like.

Optionally, the UE may send the fifth signal in a slot, which may be implemented in the following two manners:

Manner 1—The fifth signal is sent to the base station.

The slot may be a slot in a forwarding time window of the first network node.

As shown in FIG. 5, after receiving the fifth signal, the first network node performs S516 of forwarding the fifth signal, and the base station associated with the first network node receives the fifth signal sent by the UE.

S518: After receiving the fifth signal, the base station, the base station controls a beam direction of the first network node by using control signaling for controlling the first network node, to communicate with the UE through the first network node.

Manner 2—The fifth signal is sent to the first network node.

The slot may be a slot outside a forwarding time window. The first network node receives the fifth signal sent by the UE in the slot, and then may perform processing according to a processing process after the first signal is received in the method 200 and the method 300.

Optionally, the UE sends the fifth signal to the first network node on a sending beam corresponding to a strongest reception beam for receiving the fourth signal.

It is to be noted that, an execution entity of the terminal information obtaining method provided in the embodiments of this application may be a terminal information obtaining apparatus, or may be a control module in the terminal information obtaining apparatus for performing the terminal information acquisition method. The terminal information obtaining apparatus provided in the embodiments of this application is described in the embodiments of this application by using an example in which the terminal information obtaining apparatus performs the terminal information obtaining method.

Figure 6:
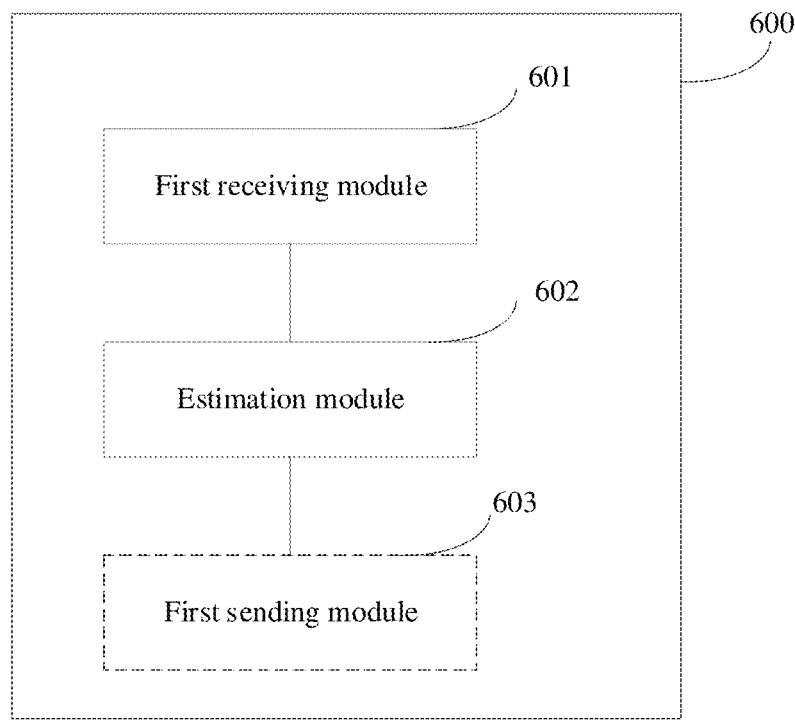
FIG. 6 is a schematic structural diagram of a terminal information obtaining apparatus according to an embodiment of this application.

FIG. 6 is a schematic structural diagram of a terminal information obtaining apparatus according to an embodiment of this application. The apparatus is applicable to a first network node, where the first network node may be an intelligent-surface-type device or a relay-type device.

As shown in FIG. 6, the terminal information obtaining apparatus may include: a first receiving module 601 and an estimation module 602.

In this application, the first receiving module 601 is configured to receive a first signal sent by a terminal; and the estimation module 602 is configured to estimate first information of the terminal according to the first signal, where the first information includes at least one of the following: position information of the terminal, direction information of the terminal, reception beam information corresponding to the terminal, or sending beam information corresponding to the terminal.

In a possible implementation, the receiving, by the first receiving module 601, the first signal sent by the terminal includes:

receiving the first signal sent by the terminal in a time domain repetition manner.

In a possible implementation, beams used for the first signal sent in the time domain repetition manner are different.

In a possible implementation, the receiving, by the first receiving module 601, the first signal sent by the terminal includes:

receiving the first signal sent by the terminal in a manner of polling reception beams of the first network node.

In a possible implementation, beams used for the first signal sent in the time domain repetition manner are the same.

In a possible implementation, the first signal is carried by one of the following sequences:

SRS;
DMRS;
a RACH sequence; or
a dedicated sequence of the first signal.

In a possible implementation, a format of the first signal is configured by a network side or preset.

In a possible implementation, the receiving, by the first receiving module 601, the first signal sent by the terminal includes:

obtaining the first signal through sequence detection; and/or obtaining the first signal through energy detection;

In a possible implementation, as shown in FIG. 6, the apparatus may further include: a first sending module 603, configured to send a second signal to a second network node after the first information of the terminal is estimated according to the first signal, where the second signal carries all or some of content of the first information, and the second network node is a base-station-type node associated with the first network node.

In a possible implementation, information carried by the second signal further includes at least one of the following:

information related to an identifier of the terminal;
indexes of the received first signal; or
intensity-related information of the first signal corresponding to each of the indexes.

In a possible implementation, the first receiving module 601 is further configured to: receive, after the second signal is sent to a second network node, a third signal sent by the second network node; and the estimation module 602 is further configured to adjust a transmission mode of the first network node according to the third signal.

In a possible implementation, the adjusting, by an estimation module 602, a transmission mode of the first network node according to the third signal includes:

adjusting states of a reflection unit and/or a refraction unit in the first network node according to the third signal.

In a possible implementation, the transmission mode includes at least one of the following:

a beam;
TCI information; or
QCL information.

In a possible implementation, the estimation module 602 is further configured to adjust, according to the first information, a sending beam and/or a reception beam associated with the terminal after estimating the first information of the terminal according to the first signal.

The terminal information obtaining apparatus in the embodiments of this application may be an apparatus, or may be a component, an integrated circuit, or a chip in the first network node. The apparatus may be an intelligent-surface-type device, or may be a relay-type device.

The terminal information obtaining apparatus in the embodiments of this application may be an apparatus having an operating system. The operating system may be an Android operating system, may be an ios operating system, or may be another possible operating system, and is not limited in the embodiments of this application.

The terminal information obtaining apparatus provided in the embodiments of this application can implement the processes implemented by the first network node in the method embodiment of FIG. 2 to FIG. 3 and achieve the same technical effect. To avoid repetition, details are not described herein again.

Figure 7:
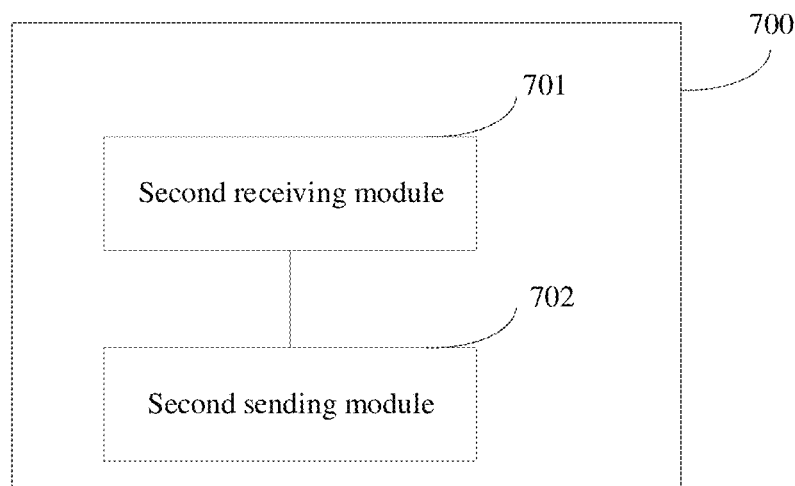
FIG. 7 is a schematic structural diagram of a signal receiving apparatus according to an embodiment of this application.

FIG. 7 is a schematic structural diagram of a signal receiving apparatus according to an embodiment of this application. The signal receiving apparatus may be configured at the terminal.

As shown in FIG. 7, the signal receiving apparatus may include: a second receiving module 701 and a second sending module 702.

In this embodiment of this application, the second receiving module 701 is configured to receive a fourth signal sent by a first network node, where the first network node is an intelligent-surface-type device or a relay-type device; and the second sending module 702 is configured to send a fifth signal to the first network node or a second network node, where the fifth signal carries some or all of information related to the fourth signal, and the second network node is a base-station-type device associated with the first network node.

In a possible implementation, the fourth signal carries second information, where the second information includes at least one of the following:
synchronization information;
identification information of the first network node;
beam information of the first network node;
a time window during which the first network node performs forwarding; or
the beam information of the first network node and time information associated with the beam information of the first network node.

In a possible implementation, the receiving, by the second receiving module 701, the fourth signal sent by the first network node includes at least one of the following:
receiving the fourth signal in a manner of polling reception beams;
obtaining the fourth signal through sequence detection; or
obtaining the fourth signal through energy detection.

In a possible implementation, the some or all of information related to the fourth signal includes at least one of the following:
at least one piece of target reception beam information, where the at least one piece of target reception beam information is related information of a reception beam with a strongest signal intensity that is estimated according to the fourth signal;
at least one piece of target sending beam information, where the at least one piece of target sending beam information is related information of a sending beam corresponding to the reception beam with the strongest signal intensity; or
information related to an identifier of the terminal.

In a possible implementation, the sending the fifth signal by the second sending module 702 includes:
sending the fifth signal in a target slot.

In a possible implementation, the target slot is a slot in a forwarding time window of the first network node.

In a possible implementation, the sending a fifth signal by a second sending module 702 includes:
sending the fifth signal to the first network node, so that the fifth signal is forwarded to the second network node by the first network node.

In a possible implementation, the target slot is a slot outside a forwarding time window of the first network node.

In a possible implementation, the sending the fifth signal by the second sending module 702 includes:
sending the fifth signal by using a target sending beam, where the target sending beam corresponds to a target reception beam, and the target reception beam is a beam used for receiving the fourth signal with a strongest signal intensity.

The signal receiving apparatus in the embodiments of this application may be an apparatus, or may be a component, an integrated circuit, or a chip in the terminal. The apparatus may be a mobile terminal or may be a non-mobile terminal. Exemplarily, the mobile terminal may include but is not limited to a type of the terminal 11 listed above, and the non-mobile terminal may be a server, a network attached storage (NAS), a personal computer (PC), a television (TV), a teller machine, a self-service machine, or the like. This is not specifically limited in the embodiments of this application.

The signal receiving apparatus in the embodiments of this application may be an apparatus having an operating system. The operating system may be an Android operating system, may be an ios operating system, or may be another possible operating system, and is not limited in the embodiments of this application.

The signal receiving apparatus provided in the embodiments of this application can implement the processes implemented by the terminal in the method embodiment of FIG. 2 to FIG. 5 and achieve the same technical effect. To avoid repetition, details are not described herein again.

Figure 8:
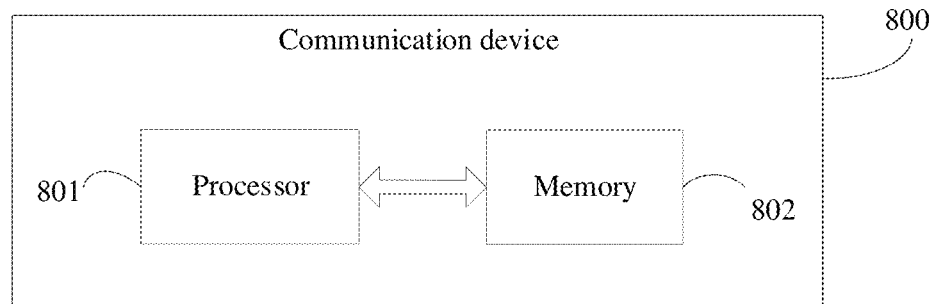
FIG. 8 is a schematic structural diagram of a communication device according to an embodiment of this application.

Optionally, as shown in FIG. 8, an embodiment of this application further provides a communication device 800, including a processor 801, a memory 802, and a program or instructions stored in the memory 802 and executable on the processor 801. For example, in a case that the communication device 800 is a terminal, the program or instructions is executed by the processor 801 to implement the processes of the embodiments of the signal receiving method, and the same technical effects can be achieved. In a case that the communication device 800 is a network side device, the program or instructions is executed by the processor 801 to implement the processes of the embodiments of the terminal information obtaining method, and the same technical effects can be achieved. To avoid repetition, details are not described herein again.

Figure 9:
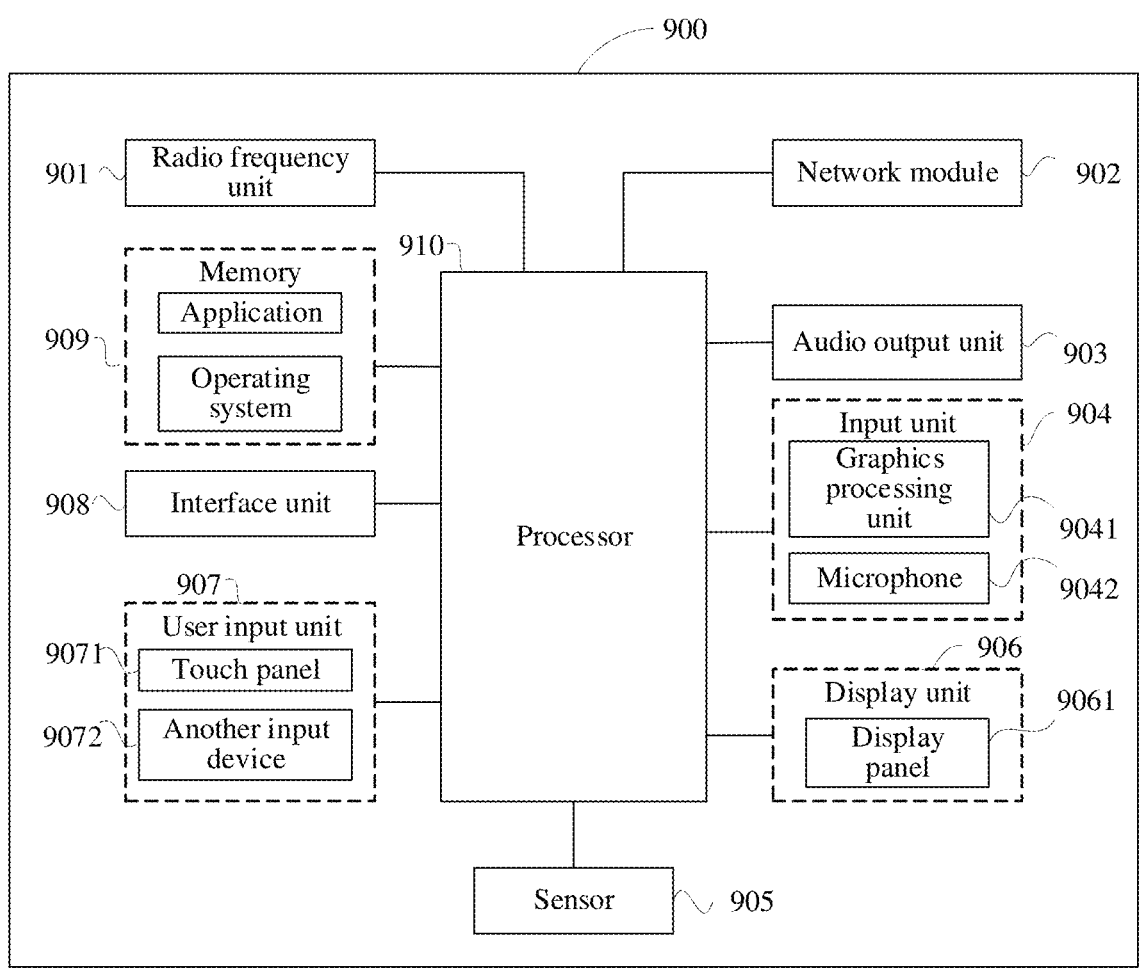
FIG. 9 is a schematic structural diagram of hardware of a terminal according to an embodiment of this application.

FIG. 9 is a schematic structural diagram of hardware of a terminal according to an embodiment of this application.

The terminal 900 includes, but is not limited to, components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that, the terminal 900 may further include a power supply (such as a battery) for supplying power to the components. Preferably, the power supply may be logically connected to the processor 910 by using a power management system, thereby implementing functions such as charging, discharging, and power consumption management by using the power management system. A terminal structure shown in FIG. 9 does not constitute a limitation to the terminal, and the terminal may include more or fewer components than those shown in the figure, or some components may be combined, or a different component deployment may be used. Details are not described herein again.

It may be understood that, in the embodiments of this application, the input unit 904 may include a graphics processing unit (GPU) 9041 and a microphone 9042. The graphics processing unit 9041 processes image data of a static picture or a video obtained by an image capturing apparatus (for example, a camera) in a video capturing mode or an image capturing mode. The display unit 906 may include a display panel 9061, for example, a display panel 9061 configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. the another input device 9072 may include, but is not limited to, a physical keyboard, a functional key (such as a volume control key or a switch key), a track ball, a mouse, and a joystick, and the details will not be described herein again.

In this embodiment of this application, the radio frequency unit 901 receives downlink data from a network side device and sends the data to the processor 910 for processing; and sends uplink data to the network side device. Generally, the radio frequency unit 901 includes, but is not limited to, an antenna, at least one amplifier, a transceiver, a coupler, a low noise amplifier, a duplexer, and the like.

The memory 909 may be configured to store a software program or instructions and various data. The memory 909 may mainly include a program storage or instruction area and a data storage area. The program storage or instruction area may store an operating system, an application program or instructions required by at least one function (for example, a sound playback function and an image playback function), or the like. In addition, the memory 909 may include a high speed RAM, and may further include a non-volatile memory. The non-volatile memory may be a read-only memory (ROM), a programmable ROM (PROM), an erasable programmable read-only memory (EPROM), an electrically EPROM (EEPROM), or a flash memory. For example, at least one magnetic disk storage device, a flash memory device, or another non-volatile solid-state storage device.

Optionally, the processor 910 may include one or more processing units. Optionally, the processor 910 may integrate an application processor and a modem processor. The application processor mainly processes an operating system, a user interface, an application program or instructions, and the like. The modem processor mainly processes wireless communication, for example, a baseband processor. It may be understood that the modulation and demodulation processor may not be integrated into the processor 910.

The radio frequency unit 901 is configured to receive a fourth signal sent by a first network node, where the first network node is an intelligent-surface-type device or a relay-type device; and send a fifth signal to the first network node or a second network node, where the fifth signal carries some or all of information of the fourth signal, and the second network node is a base-station-type device associated with the first network node.

In a possible implementation, the fourth signal carries second information, where the second information includes at least one of the following:
synchronization information;
identification information of the first network node;
beam information of the first network node;
a time window during which the first network node performs forwarding; or
the beam information of the first network node and time information associated with the beam information of the first network node.

In a possible implementation, the receiving, by the radio frequency unit 901, a fourth signal sent by the first network node includes at least one of the following:
receiving, by the terminal, the fourth signal in a manner of polling reception beams;
obtaining the fourth signal through sequence detection; or
obtaining the fourth signal through energy detection.

In a possible implementation, the some or all of information of the fourth signal includes one of the following:
at least one piece of target reception beam information and/or at least one piece of target sending beam information, where the at least one piece of target reception beam information is related information of a reception beam with a strongest signal intensity that is estimated according to the fourth signal, and the at least one piece of target sending beam information is related information of a sending beam corresponding to the reception beam with the strongest signal intensity; or
information related to an identifier of the terminal.

In a possible implementation, the sending a fifth signal by the radio frequency unit 901 includes:
sending the fifth signal in a target slot.

In a possible implementation, the target slot is a slot in a forwarding time window of the first network node.

In a possible implementation, the sending a fifth signal by the radio frequency unit 901 includes:
sending the fifth signal to the first network node, so that the fifth signal is forwarded to the second network node by the first network node.

In a possible implementation, the target slot is a slot outside a forwarding time window of the first network node.

In a possible implementation, the sending the fifth signal by the radio frequency unit 901 includes:
sending the fifth signal by using a target sending beam, where the target sending beam corresponds to a target reception beam, and the target reception beam is a beam used for receiving the fourth signal with a strongest signal intensity.

Figure 10:
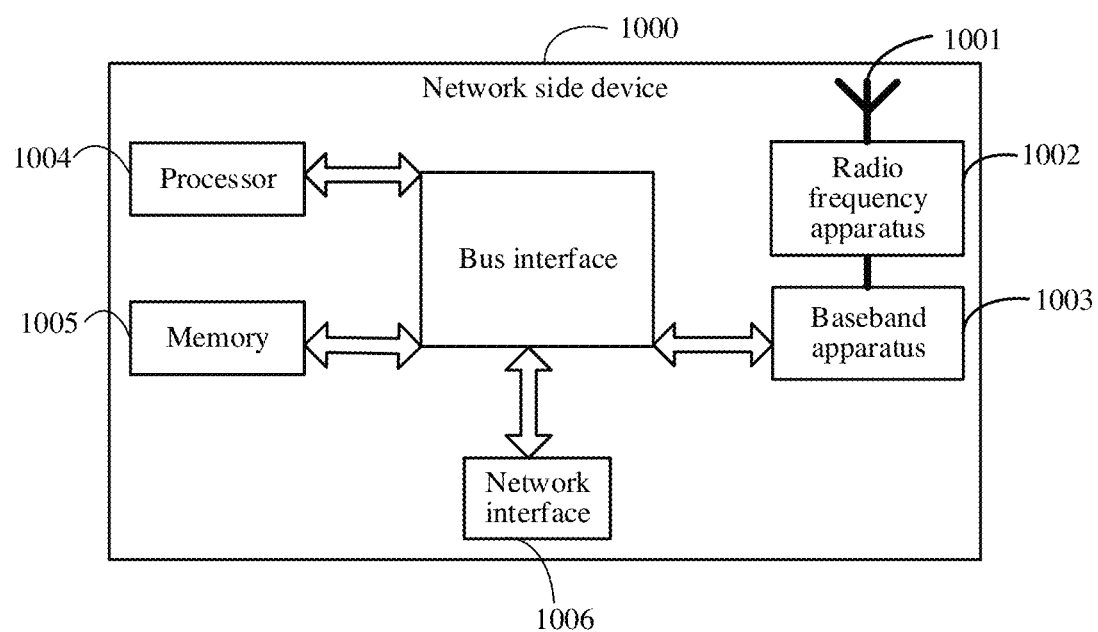
FIG. 10 is a schematic structural diagram of hardware of a network side device according to an embodiment of this application.

Illustratively, an embodiment of this application further provides a network side device. As shown in FIG. 10, the network side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes to-be-processed information, and sends the information to the radio frequency apparatus 1002. The radio frequency apparatus 1002 processes received information and sends the information by using the antenna 1001.

The frequency band processing apparatus may be located in the baseband apparatus 1003, and the method performed by the network side device in the foregoing embodiments may be implemented in the baseband apparatus 1003. The baseband apparatus 1003 includes a processor 1004 and a memory 1005.

The baseband apparatus 1003 may include, for example, at least one baseband plate. A plurality of chips are arranged on the baseband plate. As shown in FIG. 100, one of the plurality of chips is, for example, the processor 1004, and is connected to the memory 1005, to invoke a program in the memory 1005 to perform operations performed by the network side device in the foregoing method embodiment.

The baseband apparatus 1003 may further include a network interface 1006, configured to exchange information with the radio frequency apparatus 1002. The interface is, for example, a common public radio interface (CPRI).

Illustratively, the network side device in this embodiment of this application further includes: instructions or a program stored in the memory 1005 and executable on the processor 1004, and the processor 1004 invokes the instructions or program in the memory 1005 to perform the method performed by the modules shown in FIG. 6, and can achieve the same technical effect. To avoid repetition, details are not described herein again.

It is to be noted that, the network side device may be used as a relay-type device to execute the functions executed by the first network node in the method 200 to method 500.

In a case that the first network node is an intelligent-surface-type device, the first network node may not adopt the structure of the network side device, but adopt a structure of a device such as a large intelligent surface (LIS), a smart reflect array (SRA), a reconfigurable reflect array (RRA), or an intelligent reflecting surface (IRS).

In this application, the intelligent-surface-type device may adopt a static reflect array/intelligent surface. The structure and function of the reflect array may be fixed. For an incident wave at an angle, the metasurface unit leads to a fixed change in the amplitude, phase, polarization, and other characteristics of the incident wave, and a corresponding reflected wave is obtained.

Alternatively, the intelligent-surface-type device may also adopt a dynamic reflect array/intelligent surface: The structure and function of the reflect array is controllable. For an incident wave at an angle, the amplitude, phase, polarization, and other characteristics of the incident wave may be changed differently through programmable control, and a corresponding reflected wave is obtained. To achieve programmable control of reflective metasurfaces, switch elements (such as diodes, RF-MEMS switches, and the like) need to be configured in the reflection unit.

The structure of the intelligent-surface-type device is not limited in this application.

An embodiment of this application further provides a non-transitory readable storage medium, storing a program or instructions, the program or instructions, when executed by a processor, implementing the processes of the embodiments of the terminal information obtaining method or the processes of the embodiments of the signal receiving method, and achieving the same technical effect. To avoid repetition, details are not described herein again.

The processor is a processor in the terminal in the foregoing embodiments. The non-transitory readable storage medium includes a non-transitory computer-readable storage medium, for example, a read-only memory (ROM), a random access memory (RAM), a magnetic disk, an optical disk, or the like.

An embodiment of this application further provides a chip, including a processor and a communication interface coupled to each other, the processor being configured to run a program or instructions of a network side device to implement the processes of the embodiments of the terminal information obtaining method or the processes of the embodiments of the signal receiving method, and can achieve the same technical effects. To avoid repetition, details are not described herein again.

It should be understood that, the chip mentioned in this embodiment of this application may also be referred to as a system-level chip, a system chip, a chip system, a system on chip, or the like.

It is to be noted that, the term "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the embodiments of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing embodiments, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the related art may be implemented in the form of a software product. The computer software product is stored in a storage medium (such as a read-only memory (ROM)/random access memory (RAM), a magnetic disk, or an optical disc), and includes several instructions for instructing a terminal (which may be a mobile phone, a computer, a server, an air conditioner, a network side device, or the like) to perform the method described in the embodiments of this application.

The embodiments of this application are described above with reference to the accompanying drawings. However, this application is not limited to the foregoing implementations. The foregoing implementations are merely illustrative rather than limitative. A person of ordinary skill in the art may derive various forms from this application without departing from the spirit of this application and the scope claimed by the claims, which are all under the protection of this application.

What is claimed is:

1. A terminal information obtaining method, performed by a first network node, wherein the first network node is an intelligent-surface-type device or a relay-type device and the method comprises:
 receiving a first signal sent by a terminal; and
  estimating first information of the terminal according to the first signal; wherein
   the first information comprises at least one of following: position information of the terminal, direction information of the terminal, reception beam information corresponding to the terminal, or sending beam information corresponding to the terminal;
wherein after the estimating the first information of the terminal according to the first signal, the method further comprises:
sending a second signal to a second network node; wherein the second signal carries all or some of content of the first information, and the second network node is a base-station-type node associated with the first network node;
receiving a third signal sent by the second network node; and
adjusting a transmission mode of the first network node according to the third signal;
wherein the transmission mode comprises at least one of following:
a beam;
transmission configuration index (TCI) information; or
quasi-colocation (QCL) information.

2. The method according to claim 1, wherein the first signal is carried by one of following:
a sounding reference signal (SRS);
a demodulation reference signal (DMRS);
a random-access channel (RACH) sequence; or
a dedicated sequence of the first signal.

3. The method according to claim 1, wherein the receiving the first signal sent by the terminal comprises:
obtaining the first signal through sequence detection; and/or
obtaining the first signal through energy detection.

4. The method according to claim 1, wherein information carried by the second signal further comprises at least one of following:
information related to an identifier of the terminal;
indexes of the received first signal; or
intensity-related information of the first signal corresponding to each of the indexes.

5. The method according to claim 1, wherein the adjusting the transmission mode of the first network node according to the third signal comprises:
adjusting states of a reflection unit and/or a refraction unit in the first network node according to the third signal.

6. The method according to claim 1, wherein after the estimating the first information of the terminal according to the first signal, the method further comprises:
adjusting, according to the first information, a sending beam and/or a reception beam associated with the terminal.

7. The method according to claim 1, wherein the receiving the first signal sent by the terminal comprises:
receiving the first signal sent by the terminal in a time domain repetition manner.

8. The method according to claim 7, wherein beams used for the first signal sent in the time domain repetition manner are different; or
beams used for the first signal sent in the time domain repetition manner are the same.

9. The method according to claim 8, wherein, in a case that beams used for the first signal sent in the time domain repetition manner are different, the receiving the first signal sent by the terminal comprises:
receiving the first signal sent by the terminal in a manner of polling reception beams.

10. A signal receiving method, performed by a terminal and comprising:
receiving a fourth signal sent by a first network node; wherein
the first network node is an intelligent-surface-type device or a relay-type device; and
sending a fifth signal to the first network node or a second network node; wherein
the fifth signal carries some or all of information related to the fourth signal, and the second network node is a base-station-type device associated with the first network node;
wherein the some or all of information related to the fourth signal comprises at least one of following:
at least one piece of target reception beam information, wherein the at least one piece of target reception beam information is related information of a reception beam with a strongest signal intensity that is estimated according to the fourth signal;
at least one piece of target sending beam information, wherein the at least one piece of target sending beam information is related information of a sending beam corresponding to the reception beam with the strongest signal intensity; or
information related to an identifier of the terminal.

11. The method according to claim 10, wherein the fourth signal carries second information, the second information comprising at least one of following:
synchronization information;
identification information of the first network node;
beam information of the first network node;
a time window during which the first network node performs forwarding; or
time information associated with the beam information of the first network node.

12. The method according to claim 10, wherein the receiving the fourth signal sent by the first network node comprises at least one of following:
receiving the fourth signal in a manner of polling reception beams;
obtaining the fourth signal through sequence detection; or
obtaining the fourth signal through energy detection.

13. The method according to claim 10, wherein the sending the fifth signal comprises:
sending the fifth signal in a target slot; and/or
sending the fifth signal by using a target sending beam, wherein the target sending beam corresponds to a target reception beam, and the target reception beam is a beam used for receiving the fourth signal with a strongest signal intensity.

14. The method according to claim 13, wherein the target slot is a slot in a forwarding time window of the first network node; or
the target slot is a slot outside a forwarding time window of the first network node.

15. The method according to claim 14, wherein, in a case that the target slot is a slot in a forwarding time window of the first network node, the sending the fifth signal comprises:
sending the fifth signal to the first network node, so that the fifth signal is forwarded to the second network node by the first network node.

16. A terminal, comprising a processor, a memory, and a program or instructions stored in the memory and executable on the processor, the program or instructions, when executed by the processor, implementing steps of the signal receiving method according to claim 10.

17. A first network node, wherein the first network node is an intelligent-surface-type device or a relay-type device and comprises a processor, a memory, and a program or instructions stored in the memory and executable on the processor, wherein the program or instructions, when executed by the processor, causes the first network node to perform:
 receiving a first signal sent by a terminal; and
 estimating first information of the terminal according to the first signal; wherein
 the first information comprises at least one of following: position information of the terminal, direction information of the terminal, reception beam information corresponding to the terminal, or sending beam information corresponding to the terminal;
 wherein the program or instructions, when executed by the processor, causes the first network node to further perform:
 sending a second signal to a second network node; wherein the second signal carries all or some of content of the first information, and the second network node is a base-station-type node associated with the first network node;
 receiving a third signal sent by the second network node; and
 adjusting a transmission mode of the first network node according to the third signal;
 wherein the transmission mode comprises at least one of following:
 a beam;
 transmission configuration index (TCI) information; or
 quasi-colocation (QCL) information.

\* \* \* \* \*